No. 755,169. Patented March 22, 1904.

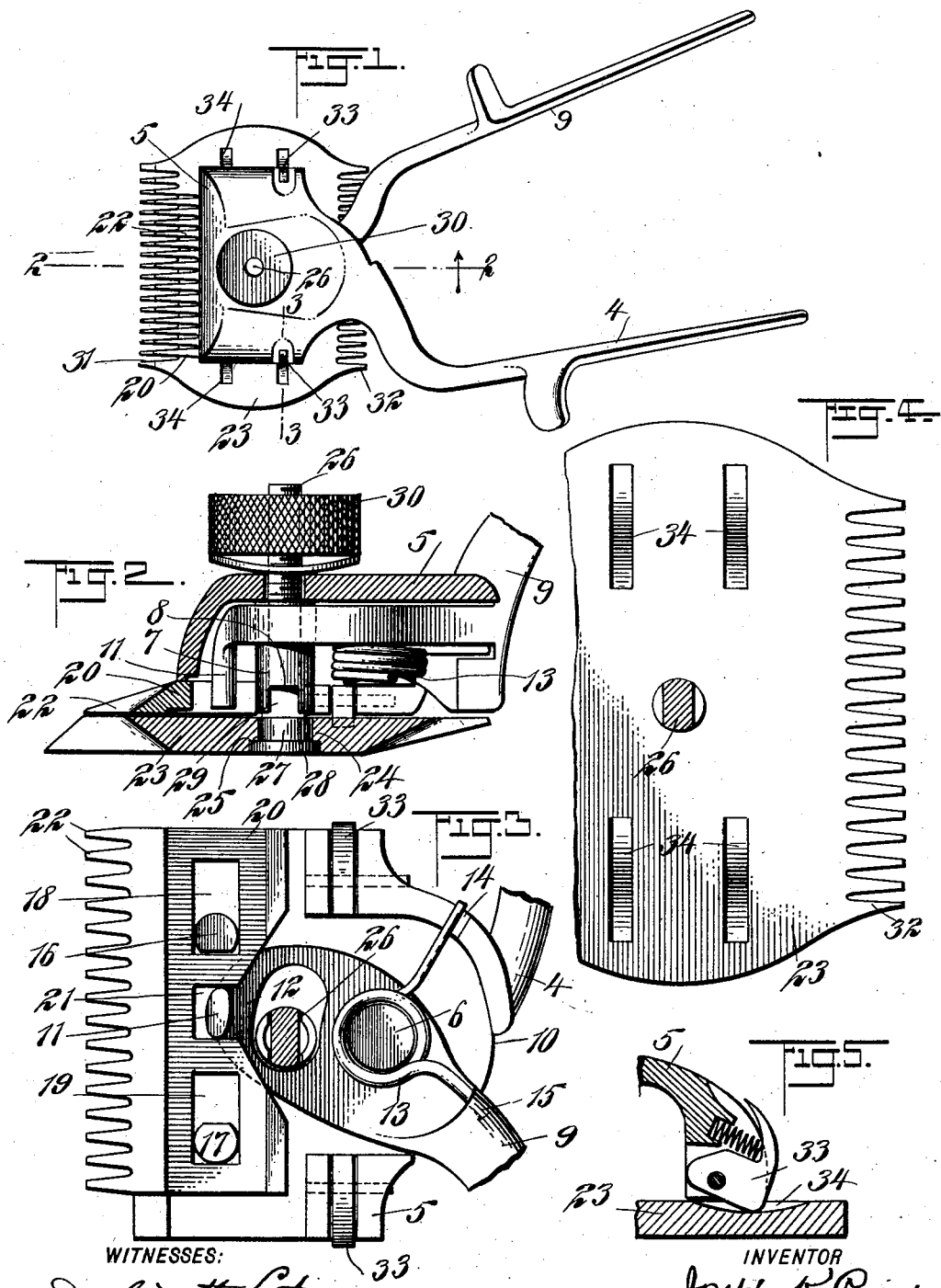

UNITED STATES PATENT OFFICE.

JOSEPH K. PRIEST, OF NASHUA, NEW HAMPSHIRE, ASSIGNOR TO AMERICAN SHEARER MANUFACTURING COMPANY, OF NASHUA, NEW HAMPSHIRE, A CORPORATION OF NEW HAMPSHIRE.

SHEARING AND CLIPPING DEVICE.

SPECIFICATION forming part of Letters Patent No. 755,169, dated March 22, 1904.

Application filed August 3, 1903. Serial No. 167,972. (No model.)

*To all whom it may concern:*

Be it known that I, JOSEPH K. PRIEST, a citizen of the United States, residing at Nashua, county of Hillsboro, State of New Hampshire, have invented certain new and useful Improvements in Shearing and Clipping Devices, of which the following is a specification.

My present invention relates to clipping and shearing devices, and particularly appertains to clippers, whether hand or power operated.

This invention consists in providing means whereby the clipper is rendered adjustable to different depths of cut without the application thereto of extra parts or the interchange of detached parts, such as the comb.

This invention also lies in providing means whereby the depth of cut may be regulated without altering the tension on the top cutting-plate, it being desirable not to change this tension when once adjusted, while the depth of cut is of necessity required to be changed frequently.

This invention further consists in the construction, arrangement, and combination of the several parts comprising these means, substantially as hereinafter described, and specifically pointed out in the claims.

I have illustrated in the drawings a hand-clipper embodying one form of my invention, many ways of constructing the same being possible without departing from the spirit of my invention as set forth in the claims.

In the drawings, Figure 1 is a plan view of said clipper; Fig. 2, a vertical section on line 2 2 of Fig. 1; Fig. 3, a bottom view with the comb-plate removed, showing the tension-bolt in section; Fig. 4, a broken plan view of the comb-plate, showing the tension-bolt in section; and Fig. 5, a detail in section on line 3 3 of Fig. 1 of one of the comb-plate-locking devices.

Referring to the drawings, the handle 4 is made integral with a hollow casing 5. Within the casing 5 are provided a rigid stud 6 and a rigidly-secured tube 7, the bore of which tube 7 is continued through the top of casing 5. The lower or outer end of tube 7 has a transverse slot 8. A second handle 9 is pivoted upon the stud 6, projecting without the casing 5, through an aperture 10 in the rear wall thereof. The handle 9 is extended forwardly of the stud 6 and the tube 7 to form a lever having an angle projection 11 at its forward end to engage and operate the top cutting-plate. The said lever extension of the handle 9 is provided with a slot 12, which accommodates the tube 7 and is long enough to permit of the free working of handle 9. A spring 13, coiled about the stud 6, has its respective ends seated in a slot 14 in the casing 5 and a slot 15 in the handle 9, tending to maintain handles 4 and 9 apart.

Two rigid studs 16 and 17 project downwardly from the casing 5 and are adapted to project into slots 18 and 19 in a top cutting-plate 20 and act in the twofold capacity of guides for the movement of said plate and stops for limiting its endwise movement. The top of the top cutting-plate 20 contacts the under surface of the front wall of the casing 5 and is restricted thereby from upward movement. The cutting-plate 20 also has a recess 21 between the slots 18 and 19, with which recess 21 the angle projection 11 of the handle 9 engages, so that the working of said handle 9 will impart an endwise reciprocation to said cutting-plate 20. Cutting-teeth 22 are provided in the usual manner on the forward edge of cutting-plate 20, their cutting edges being flush with the bottom plane of said plate.

When the top cutting-plate 20 is in place, the under surface thereof is flush with the under surface of that portion of the casing 5 to the rear of said plate, and the upper surface of a comb-plate 23 lies against said surfaces. The comb-plate 23 has a central aperture 24 countersunk from the under side to form a shoulder 25 therein. A bolt 26 has a head 27, adapted to enter the aperture 24 in plate 23, said head 27 having a flange 28 which is accommodated by the said countersink and bears against the shoulder 25. The bolt 26 passes up through tube 7, and oppositely-disposed lugs 29, projecting longitudinally from its head 27, enter the slot 8 in the lower end of tube 7 to prevent bolt 26 from turning. The upper end of bolt 26 projects above the casing 5 and is there threaded to receive a thumb-nut 30. A bent spring-washer is disposed between the upper surface of casing 5 and thumb-nut 30 to exert spring tension when comb-plate 23 is drawn up against the under surfaces of the top cutting-plate 20 and the casing 5.

It will be seen that the tension which may be applied to comb-plate 23 by the thumb-nut must not be great enough to prevent the operation of top cutting-plate 20, and therefore comb-plate 23 may be rotated about bolt 26, and also, as bolt 26 cannot rotate, such rotation of the comb-plate will not alter the adjusted tension.

The comb-plate is provided with several sets of cutting-teeth upon different edges thereof, two such sets, 31 and 32, being shown upon opposite edges of the comb-plate. Any of these sets of cutting-teeth may be brought into registry with the cutting-teeth 22 at the top cutting-plate 20, and each of these sets of teeth being of different depth from the remaining sets it is obvious that the depth of cut may be adjusted by simply rotating the set of proper depth into registry with teeth 22 of the top cutting-plate 20. The required depth is given the several sets of teeth upon the comb-plate by beveling the under side of the comb-plate and teeth. It is preferable to extend these bevels far in toward the center of the comb-plate.

I provide spring-pressed latches 33 in the casing 5, which engage notches or grooves 34 in the upper surface of the comb-plate when a set of teeth in the comb-plate is brought into registry with the teeth 22 of the top cutting-plate. By pressing the latches 33 the comb-plate may be rotated until the desired depth set of teeth therein is brought into registry with those of the top cutting-plate, when the latches 33, being permitted to engage the notches 34, corresponding to that set of teeth, the comb-plate will be locked securely against further rotation.

It is obvious that various means may be employed to apply the required tension and that other constructions may be substituted for that shown which will permit of the movement of the comb-plate without altering the adjustment of the tension thereon, and it is also obvious that any number of sets of teeth may be arranged upon the comb-plate commensurate with its size, all without departing from the spirit of my invention.

What I claim as new, and desire to secure by Letters Patent, is—

1. In clipping mechanism, the combination with the frame and the movable cutting-plate, of a comb-plate pivotally connected with the frame and provided with a plurality of sets of teeth adapted for registry with those of the cutting-plate, and a locking device for effecting the temporary rigid connection of the comb-plate with the frame and movably carried by one of them so as to be capable of movement from the locking position to a releasing position in which the comb-plate is free to turn about its pivot.

2. In clipping mechanism, the combination of an operatable cutting-plate, guides for preventing the rotation of said cutting-plate, a comb-plate provided with a plurality of series of teeth and adapted for adjustment to bring said series severally into operative registry with the teeth of said cutting-plate, a pivot maintaining said comb-plate in operative relation to said cutting-plate about which said comb-plate turns and means operatable independently of said guides and pivot for locking and releasing said comb-plate against and for rotative adjustment about said pivot and relatively to said cutting-plate.

3. In clipping mechanism, the combination of an operatable cutting-plate, means for operating said cutting-plate, a comb-plate provided with a plurality of series of teeth, a tension-retaining member engaging said comb-plate and maintaining the same in operative contact with said cutting-plate, said comb-plate being movable independently of the adjustment of said tension-retaining member to bring said series severally into operative registry with the teeth of said cutting-plate.

4. In clipping mechanism, the combination of an operatable cutting-plate, means for operating said cutting-plate, a bolt mounted for longitudinal movement and restricted against rotation, a shoulder on said bolt, a comb-plate provided with a plurality of series of teeth of different depths about its periphery, mounted to turn on said bolt to bring said series severally into operative registry with the teeth of said cutting-plate, and a tension device for adjusting said bolt longitudinally to draw said comb-plate, by means of said shoulder, against said cutting-plate.

5. In clipping mechanism, the combination of an operatable cutting-plate, means for operating said cutting-plate, a bolt mounted substantially perpendicularly of the plane of movement of said cutting-plate for longitudinal movement and restricted against rotation, a shoulder on said bolt, a comb-plate provided with a plurality of series of teeth of different depths about its periphery, mounted to turn on said bolt to bring said series severally into operative registry with the teeth of said cutting-plate, said bolt provided with a thumb-nut and spring to draw said comb-plate, by means of said shoulder, against said cutting-plate with the desired tension.

6. In clipping mechanism, the combination of an operatable cutting-plate, means for operating said cutting-plate, a comb-plate provided with a plurality of series of teeth of different depths upon its periphery, said comb-plate mounted for adjustment to bring said series severally into operative registry with the teeth of said cutting-plate, and a spring-locking device for securing said comb-plate in said positions of registry.

7. In clipping mechanism, the combination of an operatable cutting-plate, means for operating said cutting-plate, a comb-plate provided with a plurality of series of teeth of different depths upon its periphery, a tension-retaining device maintaining said comb-plate in operative contact with said cutting-plate with any desired tension, said comb-plate adjustable independently of said tension-retaining device to bring said series severally into operative registry with the teeth of said cutting-plate, and a manually-releasable dog for securing said comb-plate in said position of registry.

In testimony whereof I have signed my name to this specification in the presence of two subscribing witnesses.

JOSEPH K. PRIEST.

Witnesses:
JOHN P. GOGGIN,
WARREN B. NELSON.